United States Patent

[11] 3,610,727

[72] Inventor Reinha...
     Matawan, N.J.
[21] Appl. No. 865,051
[22] Filed Oct. 9, 1969
[45] Patented Oct. 5, 1971
[73] Assignee Bell Telephone Laboratories, Incorporated
     Murray Hill, Berkeley Heights, N.J.

[54] COUPLING ARRANGEMENT FOR THIN-FILM OPTICAL DEVICES
     13 Claims, 6 Drawing Figs.
[52] U.S. Cl. ........................................... 350/96 WG,
                                                      331/94.5
[51] Int. Cl. ......................................... G02b 5/14
[50] Field of Search ............................... 350/96 WG

[56] References Cited
     UNITED STATES PATENTS
     2,945,413  7/1960  Kelly .................... 350/166
     3,291,554  12/1966  Price ................... 350/285
     3,517,327  6/1970  Treuthart ............... 350/286 X
     ...,...,...  1/1970  Osterberg et al. .... 350/96 X OTHER REFERENCES
Tien et al. " Modes of Propagating Light Waves in Thin Deposited Semiconductor Films" Applied Physics Letters Vol. 14, No. 9, May 1969, pp. 291- 294. 350- 96 WG

*Primary Examiner*—John K. Corbin
*Attorneys*—R. J. Guenther and Arthur J. Torsiglieri ABSTRACT: A coupling arrangement for thin-film optical devices is disclosed which couples a laser beam into or out of a thin-film light guide with high efficiency. The coupling between the thin-film guide and its bulk substrate is provided by an auxiliary film of low refractive index whose thickness is smoothly increased throughout the coupling region so that, for input coupling, the competing output coupling effect is minimized. In a preferred embodiment, the thickness of the thin-film guide itself is also increased beyond the coupling region. This permits then the thickness of the auxiliary coupling film to be tapered off, eventually to zero thickness, in the region of increased guide thickness.

INVENTOR
R. ULRICH
BY Wilford L. Wisner
ATTORNEY

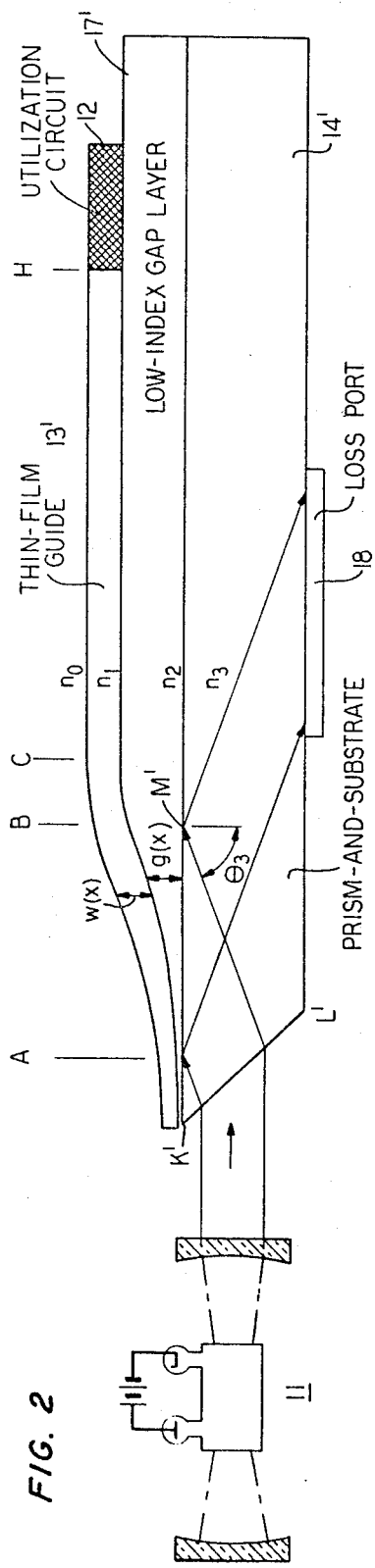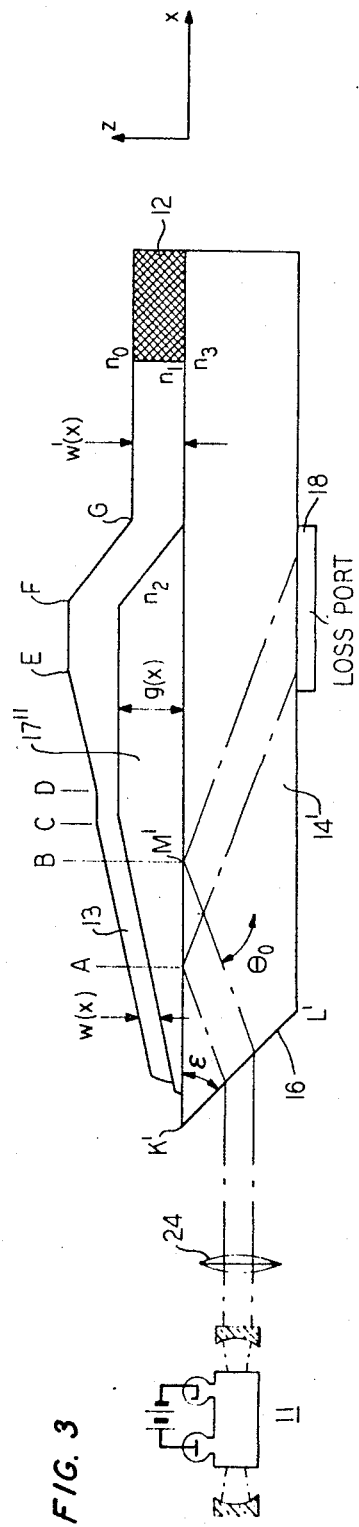
FIG. 2
FIG. 3

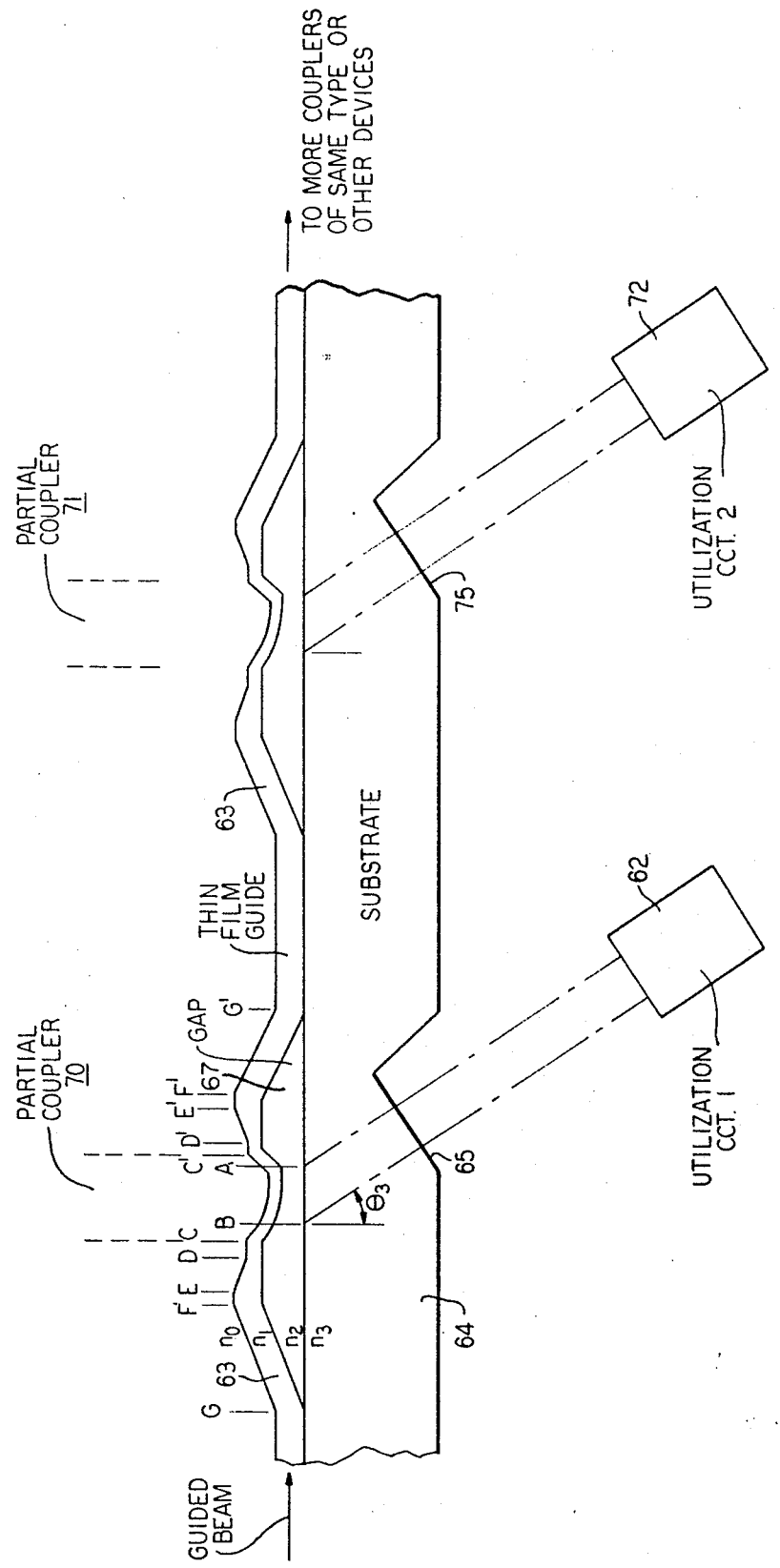

COUPLING ARRANGEMENT FOR THIN-FILM OPTICAL DEVICES

BACKGROUND OF THE INVENTION

This invention relates to light coupling arrangements for thin-film optical devices.

In this context, a thin film is a body of dielectric material having one dimension comparable to the wavelength of the light to be propagated, so that the light is effectively confined in that dimension by the dielectric discontinuities provided by the major surfaces of the film. Nevertheless, in a thin-film optical device, the light is not necessarily confined in the orthogonal dimension by such surfaces or discontinuities. In cases in which the orthogonal dimension is small enough to produce guiding, that orthogonal dimension is nonetheless larger than the one dimension.

Heretofore, the usefulness of thin-film optical devices has been impeded by the difficulties of efficiently coupling light into and out of the thin film. Coupling through the edge of the film is, at best, very lossy because of the usual roughness and other optical imperfections of the edges. Moreover, coupling through the edge is typically impractical since it is difficult to focus the beam down to a thickness comparable to the film thickness and to align the beam with respect to the film.

In the copending patent application of P. K. Tien, Ser. No. 793,696, filed Jan. 24, 1969, and assigned to the assignee hereof, a technique is disclosed for coupling light waves through a major surface of the thin film, hereinafter called the "guide." A major surface is relatively smooth and perfect compared to the edge of the guide. In addition, such coupling will automatically concentrate a relatively broad beam with respect to the thin dimension of the guide with a consequent gain in light intensity. A reasonable coupling efficiency is attained in this method of P. K. Tien by maintaining a coupling gap of a specific, uniform thickness, between the base of a coupling prism and the guide throughout the coupling region. Here and in the following, the "coupling efficiency" is defined as that net fraction of the energy of an incident light beam that is transferred finally into the guide by the coupler. The coupling region is the region of a major surface of the thin film, which is illuminated by light energy in transit therethrough.

In employing the P. K. Tien technique for integrated circuit fabrication, the coupling prisms could be fabricated by depositing on top of the guide an extended dielectric medium which is cut later in the shape of the required prisms. The continuous gap would be maintained typically by means of an intermediate dielectric layer of relatively low refractive index compared to that of the prism and that of the guide.

A difficulty with this aspect of the P. K. Tien technique resides in the fact that the coupling gap must be increased rather abruptly in thickness at some point along the path of light propagation past the coupling region. This is necessary in order to prevent light that has already been coupled into the film from being coupled back again into the prism. The optimum shape and position of this thickness step of the gap layer have to be determined by compromises: If too abrupt, the step will cause losses by mode conversion (including reflection and radiation). Too smooth a step, in contrast, does not interrupt the back coupling effect sufficiently abruptly, so that light is lost by this effect from the guide. Similarly, a step positioned too far past the coupling region reduces the coupling efficiency by excessive back coupling. Too close to the coupling region, however, the step may overlap with the incident beam so that only a part of that beam can contribute to the coupling, which also results in a reduced coupling efficiency. These contradicting requirements for the position of the step of gap thickness in fact limit the theoretically possible coupling efficiency to less than 82 percent for this coupler with uniform gap, assuming a Gaussian or boxcar beam profile.

SUMMARY OF THE INVENTION

According to my invention, a nonuniform, i.e., tapered coupling gap overcomes the problems of the prior art described above. Such a coupling gap, properly designed, eliminates completely the undesirable back coupling effect throughout the coupling region. In this way, a coupling efficiency very close to unity (100 percent) is achieved.

For application in integrated optical circuits, the basic coupler with tapered gap can be modified and implemented in several respects. For example, the coupling prism itself, coated with a film of low index material of nonuniform thickness, to provide the gap, can be used as the substrate that supports the thin-film guide. This embodiment of my invention depends critically on the optical quality of the low index layer used as gap. At the present state of thin-film deposition technique, this gap layer typically has considerably higher absorption losses and more imperfections than a glass substrate. These losses and imperfections of the gap layer attenuate the propagation of light in the thin-film guide, since an evanescent part of the light field propagates in the gap layer.

According to another feature of my invention, this undesired attenuation is reduced all along an intended path of light propagation by the introduction of an increase of thickness in the guiding film to permit the elimination of this gap layer beyond a short distance past the coupling region. Thereafter, the light-guiding thin film of increased thickness can thus be deposited directly on the prism as substrate. The latter feature is implemented in some embodiments by increasing the relative propagation constant $\beta$ of the guide smoothly over a distance of several light wavelengths beyond the coupling region to a value higher than the refractive index $n_3$ of the substrate, through which input coupling is provided. The gap layer is then similarly smoothly tapered to zero. Since the relative propagation constant $\beta$ of the guide typically is influenced slightly by the changing gap thickness, small compensating additional variations in the thickness of the guide are provided to maintain that $\beta$ uniformly throughout the coupling region of nonuniform thickness that is required for the desired phase-matched cumulative coupling interaction with the incident beam.

In one specific embodiment the need for compensating changes in guide thickness throughout the coupling region is eliminated by using a specific angle of incidence for the beam on the prism base and providing a guide with the appropriate uniform thickness in the coupling region.

It is an advantage of my invention that a prism-film coupler with a nonuniform coupling gap can be provided whose coupling efficiency exceeds that of a coupler with uniform gap and closely approaches the theoretical maximum of unity.

Another advantage of my invention is that in one embodiment, the coupler can be formed completely by depositions of thin films: The substrate of the guide is used as the necessary extended coupling medium. The edges of this substrate can be beveled so as to provide the coupling prisms. The tapered gap materials in the coupling regions and following those regions, and the guide itself, can then be formed on the substrate by deposition of suitable tapered thin films.

Still another advantage of my invention is that it allows coupling to any selected one of the possible electromagnetic modes of the guide, by choosing the proper polarization and angle of incidence.

Furthermore, the coupler described here is reversible, i.e., it can be used not only to couple a freely propagating wave into the guide, but equally well to couple a guided wave out of the guide into free space.

For coupling into the guide, the coupler can be designed to accept a single-mode light beam of any prescribed cross section. For output coupling, the coupler can be designed to produce a freely propagating beam of any prescribed spatial and angular distribution, within certain wide limits.

In one specific embodiment of my invention serving as a partial output coupler, only a prescribed fraction of the light propagating in the guide is coupled out, while the rest of the light energy propagates past the output coupling region.

It is a further advantage of my invention that it is entirely compatible with the thin-film optical devices described in my copending patent application with R. J. Martin, Ser. No. 835,484, filed June 23, 1969, and assigned to the assignee hereof.

BRIEF DESCRIPTION OF THE DRAWING

Further features and advantages of my invention will become apparent from the following detailed description, taken together with the drawing, in which:

FIG. 2 is a partially pictorial and partially block-diagrammatic illustration of a coupler with nonuniform gap in which the substrate is used as a coupling prism;

FIG. 3 is a partially pictorial and partially block-diagrammatic illustration of my invention employing a tapered guide and a double-tapered gap.

FIG. 6 is a partially pictorial and partially block-diagrammatic illustration of another modification of my invention.

DESCRIPTION OF ILLUSTRATIVE EMBODIMENTS

Figure 1:
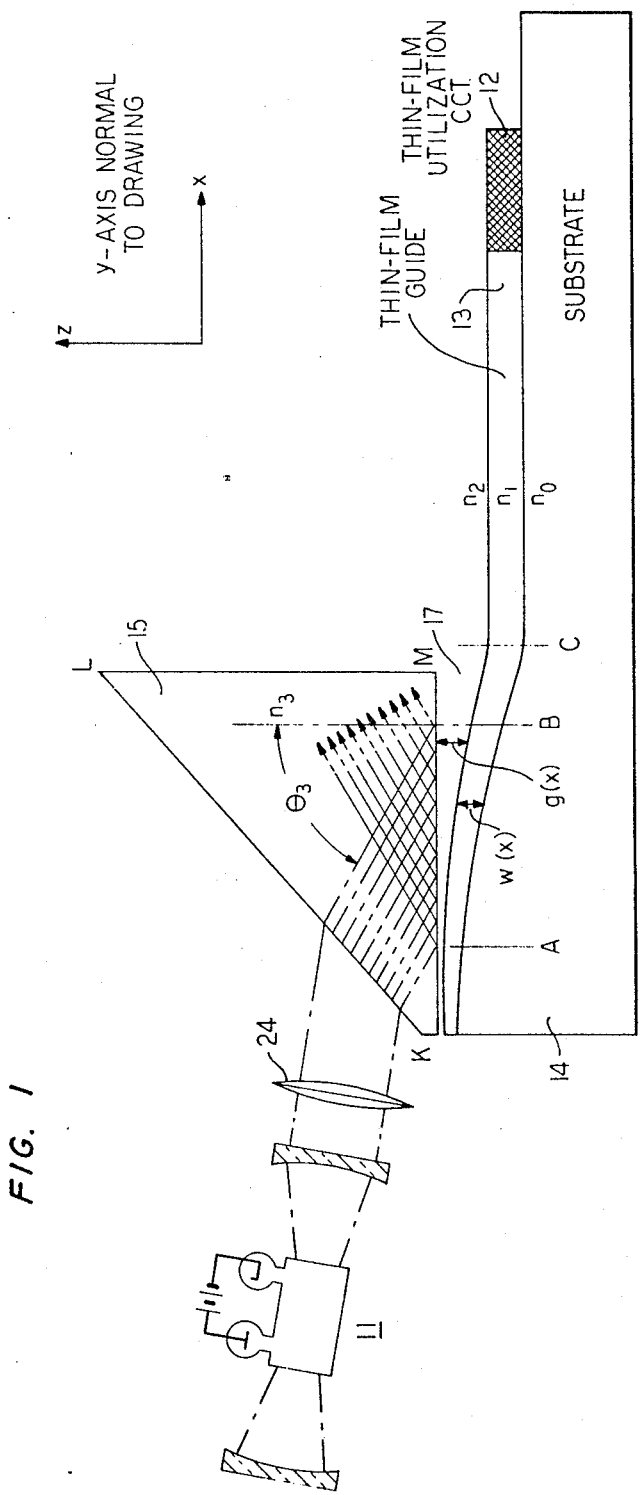
FIG. 1 is a partially pictorial and partially block-diagrammatic illustration of the basic prism-film coupler with nonuniform gap.

Theory a. Prism-film Coupler with Tapered Gap

The theory will be outlined here for the case of coupling into the guide. The use of the coupler for coupling out of the guide will be discussed at the end of this section.

In both the light-coupling arrangement of the above-cited patent application of P. K. Tien and in the arrangements disclosed herein, a primary measure of the effectiveness of the coupling is the percentage $\eta$ of the incident light energy which is transferred finally into the propagating mode in the thin-film guide. This quantity $\eta$ is called coupling efficiency, and it is the purpose of this section to demonstrate how $\eta$ can be optimized by choosing the profile of the coupling gap. The theoretical discussion is based on the coupling arrangement of FIG. 1. All quantities are assumed independent of $y$, and all materials are considered as nondissipative.

The incident light enters the prism through the face KL and is incident as a freely propagating wave on the prism base KM. The angle of incidence on the prism base is $\theta_3$, and the amplitude distribution of the incident wave along the prism base is $V_3(x)$ disregarding any reflected field and omitting the time dependence $\exp(-i\omega t)$.

Here and in the following, the refractive indices $n_j$ mean the index in the $j$th medium of the coupler ($j$=0, substrate; $j$=1, guide; $j$=2, gap; $j$=3, prism). Similarly, the field amplitudes $V_j$ mean the electric field in the $j$th medium of the coupler for the case that the incident wave is polarized with the electric vector normal to the plane of the drawing (TE-polarization); and the field amplitudes $V_j$ mean the magnetic field strengths in the case of a TM polarized incident wave.

The following analysis will first consider an incremental section of the total coupling length AB in FIG. 1. This incremental section should be short enough so that within it the thicknesses $w(x)$ of the guide and $g(x)$ of the gap may be treated as constant; later, the variabilities $w(x)$ and $g(x)$ with $x$ will be taken into account.

These abbreviations will be used:

$$\beta = n_3 \sin \theta_3 \quad (1)$$

(relative propagation constant in $x$-direction)

$$\epsilon_j = (n_j^2 - \beta^2)^{1/2} \quad (2)$$

(relative propagation constant in $z$-direction)

$$k = 2\pi/\lambda \quad (3)$$

(vacuum absolute propagation constant, with $\lambda$ = vacuum wavelength of the incident light)

$$q_j = \begin{cases} = 1 \text{ for TE polarization} \\ = n_j^2 \text{ for TM polarization} \end{cases} \quad (4)$$

(polarization coefficients)

$$r_{jk} = (q_k \epsilon_j - q_j \epsilon_k)/(q_k \epsilon_j + q_j \epsilon_k) \quad (5)$$

(reflection coefficient at interface $j,k$)

$$r_{jk} = \exp[-2i\Phi_{jk}] \quad (6)$$

(definition of the phase angles $\Phi_{jk}$ of reflection at interface $j,k$)

$$s(x) = \exp[-kg(x)(\beta^2 - n_2^2)^{1/2}] \quad (7)$$

(coupling strength)

$$t_{321} = \frac{(1+r_{32})(1+r_{21}) \exp(-ik\xi_3 g(x)) s(x)}{1 + r_{32} r_{21} s^2(x)} \quad (8)$$

(transmission factor of the gap)

$$r_{123} = (r_{12} + r_{23} s^2(x))/(1 + r_{23} r_{12} s^2(x)) \quad (9)$$

(reflection coefficient of gap and prism)

$$u(\beta) = (1 - r_{10} r_{123} \exp[2ik\epsilon_1 w(x)])^{-1} \quad (10)$$

(transfer function)

$$D(\beta,z) = 2 \cos[k\epsilon_1(z+w(x)) - \Phi_{10}] \exp(ik\epsilon_1 w(x) - i\Phi_{10}) \quad (11)$$

(transverse mode distribution)

For guidance of light in the film to be possible, $n_1$ must exceed both $n_0$ and $n_2$. Here it will be assumed that $$n_2 \leq n_0 < n_1 \quad (12)$$

Moreover, it is necessary that the refractive index $n_3$ of the prism is higher than the relative propagation constant $\beta_m$ of the mode to be coupled to, in order that a real angle $\theta_3$ exists to satisfy equation (1). Each mode in the film corresponds to one pole of the transfer function $u(\beta)$. In order to evaluate the propagation constants $\beta_m$ of the modes a phase function $\psi(\beta)$ is defined for the limit of infinite width of the coupling gap as $$\psi(\beta) = 2k\epsilon_1(\beta)w(x) - 2\Phi_{10}(\beta) - 2\Phi_{12}(\beta) \quad (13)$$

The propagation constants $\beta_m$ of the modes of a free film then are the solutions of $$\psi(\beta_m) - 2m\pi = 0 \quad m=0,1,2\ldots \quad (14)$$

All roots $\beta_m$ that correspond to propagating modes fall into the range $$n_0 < \beta_m < n_1 \quad (15)$$

For finite width of the coupling gap, $\psi(\beta)$ is modified to $\psi^{(p)}(\beta)$. The coupling will be called weak if $s(x) << 1$ (typically for $s(x) \leq 0.1$). In this case, $\psi^{(p)}(\beta)$ becomes:

$$\psi^{(p)}(\beta) = \psi(\beta) - 2s^2(x) \sin 2\Phi_{12} \cos 2\Phi_{32} \quad (16)$$

Using this function, the modes of the guide in the coupler are found as the roots $\gamma_m^{(p)}$ of $$\psi^{(p)}(\gamma_m^{(p)}) - 2m\pi = 0 \quad m = 0, 1, 2, 3, \ldots \quad (17)$$

These roots are complex, since the presence of the prism makes the guide leaky. For weak coupling $$\gamma_m^{(p)} = \beta_m^{(p)} + i\delta_m \quad (18)$$

Here $\beta_m^{(p)}$ is the relative propagation constant of the guide, modified by the presence of the prism, and $\delta_m$ is an attenuation constant.

$$\beta_m^{(p)} = \beta_m - 2(s^2(x)/\chi) \sin 2\phi_{12} \cos 2\phi_{32} \quad (19)$$

where $\beta_m$ is the relative propagation constant which that same guide would have for infinite coupling gap (as, e.g., in the region beyond point C in FIG. 1). The quantity $\chi$ in equation (19) is given by $$\chi = -\psi(\beta)/\beta \quad (20)$$

With these notations, the operation of the chosen incremental section of the coupling region can be described now.

It is assumed first that the plane wave $$V_3(x,z) = v \exp[ik(\beta x - 3z)] \quad (21)$$

be incident on the prism base. It can be shown to set up the field $V_1(x,y)$ inside the guide:

$$V_1(x,z) = v_3 u(\beta) t_{321}(\beta) D(\beta,z) \exp(ik\beta x) \quad (22)$$

This field has maximum amplitude at the peaks of the transfer function $u(\beta)$, i.e., if the angle $\theta_3$ is chosen so that $\beta$ coincides with any one of the $\beta_m^{(p)}$. Therefore, by properly choosing $\theta_3$ and the polarization of the incident wave, any mode of order $m$ can be excited selectively.

Any real light beam, incident on the prism base, is restricted in its $x$-dimension. Therefore, the amplitude distribution $V_3(x)$ of the incident beam must be represented as a superposition of plane waves of the type (21):

$$V_3(x) = \int_{-\infty}^{+\infty} v_3(\beta) \exp(ik\beta x)d\beta \qquad (23)$$

where $v_3(\beta)$ is closely related to the angular distribution of the beam. In practice, for a well collimated input beam, $v_3(\beta)$ is a very narrow spectrum peaking at that value $\beta_i$ which corresponds, by equation (1), to the mean direction $\theta_3$ of incidence of this beam.

The field $V_1$ inside the guide excited by the incident real beam (23) is found by integration of equation (22) over the spectrum $v_3(\beta)$:

$$V_1(x,z) = \int_{-\infty}^{+\infty} v_3(\beta)u(\beta)t_{321}(\beta)D(\beta,z)\exp(ik\beta x)d\beta \qquad (24)$$

Since $v_3(\beta)$ is a narrow spectrum, the slowly varying functions $t_{321}(\beta)$ and $D(\beta,z)$ may be taken in front of the integral. The remaining integral can then be rewritten by means of the convolution theorem for Fourier-integrals:

$$V_1(x,z) = (k/2\pi)t_{321}(\beta_i)D(\beta_i,z)\int U(x-\zeta)v_3(\zeta)d\zeta \qquad (25)$$

where the integration runs over the chosen incremental section, and where $U(x)$ is the Fourier transform of $u(\beta)$. For weak coupling and a narrow spectrum $v_3(\beta)$ centered near the selected $\beta_m$ the function $U(x)$ is in good approximation given by $$U_m(x) = \begin{cases} = (2\pi/\chi(\beta_m^{(p)}))\exp(ik\gamma_m^{(p)}x) & \text{for } x > 0 \\ = 0 & \text{for } x < 0 \end{cases} \qquad (26)$$

Using the fact that maximum of $|D(\beta,z)| = 2$, the following expression for the peak (with respect to $z$) amplitude $V_1(x)$ of the field in the guide can be derived from (25) and (26).

$$V_1(x) = (2k/\chi(\beta_i))t_{321}(\beta_i)\int^x \exp[ik\gamma_m^{(p)}(x-\zeta)]V_3(\zeta)d\zeta \qquad (27)$$

By differentiation of this, one obtains an expression for the rate of change of the field $V_1(x)$ in the guide as a function of the incident field $V_3(x)$ $$\frac{d}{dx}V_1(x) = (2k/\chi)t_{321}V_3(x) + ik\gamma_m^{(p)}V_1(x) \qquad (28)$$

At this point now the dependences on $x$ of the gap width $g(x)$ and the guide thickness $w(x)$ are taken into account again. This makes $t_{321}(x)$, $\gamma_m^{(p)}(x)$ and $\beta_m^{(p)}(x)$ all functions of $x$. Using these abbreviations $$a = 2(k/\chi)\sin 2\Phi_{32}\sin 2\Phi_{12} \qquad (29)$$
$$b = 2(k/\chi)(1+r)(1-r_{12}) \qquad (30)$$

the rate of change is found also for the power $|V_1(x)|^2$ carried by the guide $$\frac{d}{dx}|V_1(x)|^2 = 2s(x)\text{Re}\{bV_1(x)^*V_3(x)\} - 2s^2(x)a|V_1(x)|^2 \qquad (31)$$

Here the first term on the right-hand side describes the traveling wave interaction between the fields $V_1$ and $V_3$, and the second term describes the leaking of energy out of the guide. The equations (28) and (31) can be used in two ways: First, to compute for a given coupler with nonuniform gap and guide thicknesses the power coupled into the guide, i.e., its coupling efficiency $\eta$. Secondly, they can be used to determine the profiles $g(x)$ and $w(x)$ of gap and guide so as to maximize the power input (31) into the guide at all points. This optimizes the coupler and only this will be done here. It requires that the fields $V_1(x)$ and $V_3(x)$ be phase-matched, since this optimizes the interaction term in equation (31). The phase-matching condition is $$\arg V_3(x) = \arg V_1(x) - \arg b \qquad (32)$$

The phase $\arg V_3(x)$ of the incident beam is typically a linear function of $x$, provided the transverse amplitude distribution $V_3(x)$ of the incident beam is smooth and simple, like, e.g., in a Gaussian beam near its waist or in a beam of boxcar profile. Therefore, $\arg V_1(x)$ must also be a linear function of $x$, i.e., $\beta_m^{(p)}$ must be constant throughout the coupling region. More specifically, for optimum coupling the condition $\beta_m^{(p)} = \beta_i$ must hold. This condition can be fulfilled by a proper choice of $\theta_3$, according to equation (1). Thus, equation (32) is recognized as a generalization of the phase-matching described in the above-identified patent application of P. K. Tien. It will be shown below how $\beta_m^{(p)}$ can be held uniform despite varying coupling strength.

The power input (31) into the guide is maximized further by choosing the distribution $s(x)$ of the coupling strength according to $$s_0(x) = \frac{|b|}{2a}\left|\frac{V_3(x)}{V_1(x)}\right| \qquad (33)$$

With this choice of $s(x)$ and of phase-matching (32), the field leaking out of the guide interferes negatively with the field reflected at the prism base. The fact that the reflected wave is canceled means that all of the light energy is transferred into the guide so that the coupling efficiency becomes $\eta = 1$. With the help of (28) and (31) the optimum distribution of coupling strength can be expressed as $$s_0(x) = [2a\int_{-\infty}^{x}V_3(\zeta)/V_3(x)^2 d\zeta]^{1/2} \qquad (34)$$

The optimum profile of the coupling gap becomes, from (7)

$$g_0(x) = (\lambda/2\pi)(\beta_m\pi)(\beta^2-n_2^2)^{1/2}\ln[1/s_0(x)] \qquad (35)$$

Finally, the optimum profile of the guide is determined from the condition of uniformity of $\beta_m^{(p)}$, using equations (13)–(19):

$$w_0(x) = \frac{m\pi + \phi_{10}(\beta_m) + \phi_{12}(\beta_m) + s_0^2(x)\sin 2\phi_{12}(\beta_m)\cos 2\phi_{32}(\beta_m)}{k(n_1^2-\beta_m^2)^{1/2}} \qquad (36)$$

The results, particularly equations (34)–(36), are presented here in a form that allows to choose the mode order $m$ and, within the limits (18), also $\beta_m$ arbitrarily. It is remarkable, that for one special choice of $\beta_m$ the guide thickness $w(x)$ becomes independent of $x$. In this case $\beta_m = \beta_m^{(p)} = \bar{\beta}$ where $\bar{\beta}$ follows from $\cos 2\Phi_{32}(\beta) = 0$ and has the value $$\bar{\beta} = (q_2^2 n_3^2 + q_3^2 n_2^2)^{1/2}(q_2^2 + q_3^2)^{-1/2} \qquad (37)$$

It should be remembered here that $q_j = 1$ for TE polarization, and $q_j = n_j^2$ for TM polarization. This choice of $\beta_m = \bar{\beta}$ requires that $\theta_3$ be chosen as $\arcsin(\bar{\beta}/n_3)$. This choice is advantageous for the fabrication of the coupler since the deposition of a film of uniform thickness can be done more conveniently than a tapered gap. If, for any reason, $\beta_m < \bar{\beta}$ should have been chosen, the term $\cos \Phi_{32}$ in equation (36) is positive, and accordingly $w_0(x)$ will decrease in regions of increasing gap width $g_0(x)$, and vice versa. For $\beta_m > \bar{\beta}$, the optimum guide and gap thicknesses will vary in the same sense everywhere.

Using the optimum profiles, as given by equation (35) and (36), I have integrated the equation (31) for the power transfer and verified, that the coupling efficiency of a coupler with these nonuniform optimum profiles is indeed $\eta \to 1$ in the limit of weak coupling. It is of practical interest to known how accurately the computed profiles must be realized in order to get this high coupling efficiency. For that reason I have computed the optimum gap profile for a Gaussian beam. This optimum gap profile was then approximated by a linearly tapered gap, i.e., a wedge. Numerical integration of equation (31) for the wedge-shaped gap showed then that still coupling efficiencies of over 95 percent can be obtained, over almost a 1:2 range of wedge angles. Moreover, using the wedged gap, the position of the beam in $\pm x'$-*direction may be shifted* $\pm 10$ percent of the $1/e$ beam width without deteriorating the coupling efficiency by more than 2 percent. Such linearly tapered coupling gap is considerably more convenient for fabrication than a more special profile.

For output coupling, the prism-film coupler can be used inversely. For this case, the coupling efficiency will be defined as that part of the light energy arriving in the guide that is coupled into any prescribed radiation pattern, i.e., into one free-space mode. The rest of the arriving energy is either coupled into other free-space modes, or is reflected back into the input guide, or remains in the guide and propagates past the coupler, provided the guide exists that far.

It can be shown in a very general way that the input and output coupling efficiencies of a given, nondissipative coupler are equal, assuming identical radiation patterns for input and output. For this purpose, the coupler is described by an equivalent electrical $n$-port. One of its many parts may be the guide 13 of FIG. 1 leading to the coupling region and supporting the $m$th mode which is under consideration. This definition holds for either input or output coupling. Another port, for either input or output coupling, may be chosen to be the specified free-space mode in the coupling prism 15. All other ports can be chosen orthogonally to these two. The coupling efficiency for input into the guide is then identical with the element $S_{21}$ of the scattering matrix of this $n$-port, whereas the output coupling efficiency is identical with the element $S_{12}$. The two coupling efficiencies are thus equal, since by very general laws the scattering matrix of the dissipationless, reciprocal $n$-port is symmetric, i.e., $S_{12}=S_{21}$. Therefore, a coupler that has been designed for optimum input coupling of a certain Gaussian beam, will radiate this same beam when used as output coupler.

More in detail, the output coupling action is provided by the last term on the right-hand side of equation (31). From this equation, with $V_3=0$, the distribution $s(x)$ of the coupling strength can directly be determined that is required to produce an output beam of prescribed power distribution over its cross section. The phase distribution can also be made to fit a prescribed pattern, by suitable choice of $w(x)$. These considerations apply particularly to the design of "partial" output couplers of the type shown in FIG. 5, and are described hereinafter.

b. Coupler with $\beta$-Variation of the Guide

It is well known that a light-guiding thin film must be clad, or at least bounded, on both sides with materials of lower refractive indices, see equation (12). Usually it is assumed that the bounding media are infinitely extended in the $\pm z$-directions, i.e., normal to the surfaces of the guide.

If one of the bounding media has only a finite extension in $z$-direction and there follows beyond it a material of high index, the guide becomes leaky. This is the basis of the coupling discussed above, and the last term of equation (31) describes the leakage. From this term, the leak rate is found as $$\alpha_l \equiv \frac{1}{|V_1|^2} \frac{d|V_1|^2}{dx} = 2as^2(x) \qquad (38)$$

Here, according to equation (7), the coupling strength $s(x)$ depends exponentially on the thickness $g(x)$ of the low-index cladding material. Thus, usually a very thin low-index cladding is already sufficient to reduce the leak rate $\alpha$ of a guide below the level of attenuation caused by other means of energy loss, as absorption and scattering. This consideration is useful to determine the necessary gap thickness $g(x)$ in the region BC of the coupler of FIG. 1. In this region, where the amplitude $V_3(x$ of the incident beam vanishes, equation (35) diverges, since the optimum coupling there is zero. In practice, however, a thickness of the adjacent bounding medium, which is the gap material of the present devices, in the order of one wavelength, usually provides sufficient optical isolation.

Another way to reduce the leakage, or reverse coupling, is to increase the relative propagation constant $\beta_m$ in the guide 13 itself, preferably by increasing the thickness $w(x)$ of the guide. (The superscript $(p)$ will be omitted in this section from $\beta_m^{(p)}$, since the small difference between $\beta_m^{(p)}$ and $\beta_m$ is not significant in this context). This fact follows from a closer inspection of equations (13), (14) and (16). If such increase in guide thickness occurs smoothly over a guide length of many wavelengths, mode conversion will be negligible. Related experimental observations were made with respect to the thin-film optical devices described in my above-cited patent application with R. J. Martin.

An increase of $\beta_m$ to $\beta'_m$ can reduce the reverse coupling rate in two different ways, depending on the relative magnitudes of $\beta'_m$ and $n_3$. If $\beta'_m < n_3$ the reverse coupling is reduced but is still finite, and depends on the gap thickness $g(x)$. In the other case $$\beta_m < n_3 < \beta'_m \qquad (39)$$

so that, in contrast, the leakage vanishes completely, since along with $\Phi_{32}$ both $a$ and $\alpha$ turn imaginary. A prerequisition for this case to be possible is $$n_3 < n_1 \qquad (40)$$

The vanishing of leakage under the conditions of equation (39) is independent of the gap thickness $g(x)$. Therefore, the gap is no longer required at all in the region where equation (39) holds. This permits one to reduce $g(x)$ to zero thickness, for example, in the region beyond point F of FIG. 3. The reduction must, again, be a smooth one in order to avoid mode conversion losses.

Structural Implementation

A basic implementation that shows how my coupling arrangement compares with that of the above-cited copending patent application of P. K. Tien is shown in FIG. 1.

In FIG. 1, a coherent light beam from a suitable laser 11, illustratively of a wavelength 632.8 nanometers, is collimated by a lens 24 and refracted at surface KL upon its passage into the coupling prism 15 having index of refraction $n_3$. The prism 15 is disposed near a thin-film light guide 13 having refractive index $n_1$ with a surface KM upon which the light beam is internally incident. The width of the beam at the prism base KM is typically 1 millimeter or less. The prism base KM is separated from guide 13 by a gap 17 having a thickness, $g(x)$, of the order of a wavelength of the light. For the purpose of comparison with the Tien coupler, it is assumed the gap is an air gap, for which the index of refraction $n_2$ is less than both $n_1$ and $n_3$. While it is not generally preferred to implement such a variable-thickness air gap, it is to be understood that this embodiment of the invention is primarily illustrative. If the surface KM is to be maintained horizontal or parallel to the bottom surface of substrate 14, then the top surface of substrate 14 can be machined to have a selected shape, that is ideally determined by the sum $g_o(x)+w_o(x)$ of the equations (35) and (36) above. In a simplified embodiment this shape may be approximated by a wedge profile, typically having a slope angle of 0.0005 radians in the region A-C. The material of the guide 13, illustratively zinc sulfide, is then deposited by conventional vacuum deposition or sputtering through a moving mask, the motion being programmed to produce the variable guide thickness, $w(x)$, according to equation (36) above, in the general case. In a simplified embodiment, illustratively, the taper angle associated with $w(x)$ is between +0.0001 radians and −0.0001 radians, so that the taper angle of the gap thickness, $g(x)$, would be between 0.0004 radians and 0.0006 radians. The value of $w(x)$ at point A is illustratively about one wavelength of the laser light. Prism 15 is then moved into position and its position adjusted to produce maximum coupling while surface KM is maintained parallel to the bottom surface of substrate 14.

Illustratively included in the apparatus is the thin-film utilization circuit 12, preferably as a smooth extension of thin film 13. With appropriate doping and/or appropriate electrodes (not shown), utilization circuit 12 can be made to fulfill any of a wide variety of useful functions, such as light modulation, amplification, frequency conversion or detection.

In the operation of the embodiment, coupling of radiation into guide 13 occurs by frustrated internal reflection in prism 15 and is described mathematically by my preceding analysis. The propagation constant, $\beta_m^{(p)}$ of guide 13, at point A is greater than both $n_2$ and $n_o$ and, moreover, increases as $w(x)$ increases. Thus, guided-wave propagation of the radiation coupled into guide 13 is provided, to the extent that it is not reverse-coupled back into prism 15. The nonuniform thickness, $w(x)$, of guide 13 conforms approximately to that specified by equation (36) above to provide uniformity of the propagation constant $\beta_m^{(p)}$ therein as $g(x)$, the thickness of gap 17, varies.

The tapered thickness $g(x)$ of gap 17 affects the coupling as described theoretically above to counteract or even to render negligible the reverse coupling of radiation from guide 13 into input coupling prism 15 at points along the propagation path from A to B.

It should thus be clear that a central feature of all embodiments is the control of reverse coupling by a tapered gap within the coupling region itself. The fundamental property of the taper is a variation in thickness or material of the gap, or both, to provide destructive interference of radiation components that are reverse-coupled in the absence of the taper.

A more detailed structural arrangement of the coupling apparatus will now be described with reference to FIG. 2. Basically equivalent to the embodiment of FIG. 1 with respect to improving input coupling efficiency, the embodiment of FIG. 2 offers the structural simplicity of coupling through the substrate 14', which is beveled and used in the manner of the coupling prism 15.

In FIG. 2, a continuous layer 17' of low refractive index $n_2$ forms the gap which separates the guide 13' from the substrate 14'. Such a structure is completely a solid-state device and can be made by integrated circuit production techniques. In the coupling region AB, the gap thickness, $g(x)$, is contoured as specified by equation (35) above and the guide thickness, $w(x)$, is contoured as specified by equation (36) above.

The variable thickness layers 13' and 17' may be deposited through programmed moving masks, as is well known for example, in the optical coating art. It may be noted that the properties of the device may be uniform in the dimension orthogonal to the paper, or may include lenses or prisms in the thin-film guide 13', as in my above-cited application with R. J. Martin.

The operation of the embodiment of FIG. 2 differs only from that of FIG. 1 in that increased scattering loss and attenuation is incurred between C and H on account of the continuous dielectric gap layer 17'. invention, as illustrated in FIG. 3.

This disadvantage can be reduced by another feature of my invention, as illustrated in FIG. 3.

An integrated-circuit embodiment of the invention is shown in FIG. 3 for the purpose of illustrating a technique for eliminating the continuous gap layer, while preserving the other advantages of my invention. The specific details of materials and wavelengths to be described for this embodiment are also useful for the preceding embodiments. A coherent monochromatic beam is obtained from a laser 11, illustratively a single mode helium-neon laser operating at a wavelength of 632.8 nanometers, and is focused by a lens 24 to a diameter of illustratively 1 millimeter, measured between the 1/e points in the waist of the Gaussian beam. This beam enters the coupler at the surface 16 of the coupling prism 14' which doubles as the substrate upon which the optical guide is supported. The focus of the beam is positioned to coincide with the region AB of the substrate 14'.

The optical guide 13 is a thin film, typically of zinc sulfide, with an index of refraction $n_1=2.35$. It is separated from the coupling prism and substrate 14' by a gap 17 whose thickness is tailored consistent with my invention and filled with a low index material, typically magnesium fluoride ($MgF_2$) with an index of refraction $n_2=1.38$. The substrate 14' may be glass having, for example, an index of $n_3=1.52$.

Surface 16 of substrate 14' is cut at an angle $\epsilon=46°$ so that the incident-light beam is refracted thereat and strikes the interface with gap 17 at an angle $\theta_3=72.7°$ with respect to the normal. This angle will provide the phase-matching between the horizontal component of the incident light beam and the horizontal component of the lowest order propagating TE light wave mode in the guide 13. The evanescent tail of the incident beam couples to the propagating $TE_0$ mode in guide 13 over an area that is extended many wavelengths both in the direction of propagation of the propagating mode in guide 13, and transverse to it. The direction of propagation in guide 13 is the x-direction referred to repeatedly in the equations above. In this example, the initial thickness of guide 13 between A and D is 41.2 nanometers. For this thickness of the guide, the condition $\beta_m=\bar{\beta}$ is fulfilled for the TE ($m=0$) mode, with $\bar{\beta}=1.452$ as given by equation (37). By this value of $\beta$, also the above-mentioned angle $\theta_3$ was determined from equation (1). The thickness of the gap 17 at the center of the coupling region is about 410 nanometers, and it is sloped approximately linearly in the x-direction with a wedge angle, greatly exaggerated in FIG. 3, of about 0.00035 radians. The final thickness of the gap at point C of FIGS. 2 and 3, is about 1,500 nanometers. This thickness is sufficient so that residual leakage coupling beyond point C from the guide 13 to prism 14' is negligible as compared to other sources of loss, such as absorption.

Since the propagation constant was chosen as $\beta_0=\bar{\beta}$, in accordance with equation (37), no variation in the thickness $w(x)$ of guide 13 has been required throughout the coupling region. Thus, if it were not for manufacturing problems and causing absorption and scattering of the propagating light by the material of gap 17, the guide 13 might continue beyond point C as shown in FIG. 2.

Nevertheless, since it is desired eventually to eliminate the gap 17, a linear increasing taper of the guide 13 is started at point D and is continued until at point E the propagation constant $\beta$ of guide 13 is so large that no light can be coupled into substrate 14' even if it were in immediate proximity to guide 13.

Accordingly, at point F a taper is begun to decrease the thickness of gap 17 to zero thickness so that guide 13 and substrate 14' are eventually contiguous, beginning at point G. The thickness $w(x)$ of the guide 13 beginning at point E and continuing past point G must be, in this example, greater than 51.1 nanometers, which corresponds to a propagation constant $\beta_0$ greater than 1.520. A typical thickness $w(x)$ would be 80 nanometers.

Thus the light-confining guide 13 will continue to propagate light in the x-direction until it reaches the utilization circuit 12 which, for example, could be an optical modulator, or an optical detector, or one of the thin-film devices described in the above-cited patent application of Martin-Ulrich.

It should, of course, be apparent that the abrupt changes in slope of the gap 17 and of the guide 13 will cause some light losses by mode conversion (including reflection as well as scattering at these discontinuities). Accordingly, the transitions should practically be smoothed, as shown in FIG. 4, while retaining all the basic parameters and relationships of the embodiment of FIG. 3.

Figure 4:
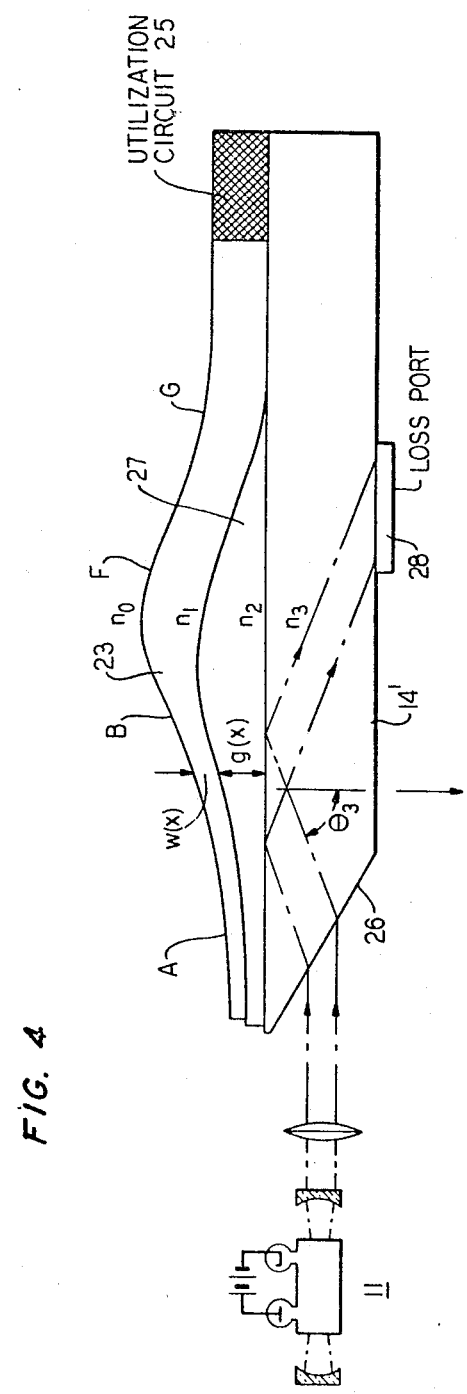
FIG. 4 is a modification of the embodiment of FIG. 3 employing smooth transitions joining the tapered regions to adjacent regions.

In FIG. 4, the transition from region to region is also made more compact in that the increase of the thickness of guide 23 is begun as soon as actual coupling is complete at point B and before the smooth increase of gap thickness is complete. This modification contributes to smooth transition which will minimize mode conversion. Also, since the final thickness of the guide 13 reached at point E in FIG. 3, is appropriate for immediate proximity to the substrate 14, and is not required at the substantial separation existing at point F in FIG. 3, the decreasing taper of the gap 27 in FIG. 4 can begin well before point F of FIG. 4. In general, the gap need increase only in the coupling region; and the guide, if it has the optimum relative phase constant $\beta_m=\bar{\beta}$ need increase only thereafter. The maximum thickness of the gap 27 depends upon the tolerable level of leakage from guide 23 to substrate 14'. In any and all events, no sharp changes in the thickness $w(x)$ and $g(x)$ or in their slopes are made in order to prevent mode conversion or reflection losses. If the guide 13 has a $\beta$ differing from $\bar{\beta}$, in general, it should have a tapered thickness $w(x)$ in the coupling region to maintain the phase match between the incident field, and the wave already propagating in the guide.

The embodiment of FIG. 4 also presents substantial fabrication advantages. In practice, the glass substrate is cut to provide the surface 26, illustratively at an angle of 46°, for incidence of the laser beam parallel to the guide, provided that it is desired to launch the lowest order TE mode at $\lambda=632.8$ nanometers in guide 23. The surfaces of the glass substrate are then polished and, if desired, a loss port 28 such as a germanium photodiode, or black paint, is deposited on the lower surface. This loss port 28 is needed only if the coupling is not 100 percent efficient in order that the reflected component of the incident beam is extracted in an orderly manner to prevent its later interference with the light propagating in guide 23 at a point farther to the right along the propagation path. The gap material of magnesium fluoride, as described above, is then deposited through a moving or rotating mask by a conventional vapor deposition technique so that the region of desired maximum thickness is exposed to the deposition atmosphere for the greatest length of time. The motion of the mask can be programmed, given an appropriately shaped opening in the mask, to provide the exact thickness contours of the gap material 27. Such deposition techniques are well known in the optical coating art. Thereafter, the zinc sulfide thin film forming the guide 23 is deposited over the gap material 27 and the right-hand portion of substrate 14 by a similar programmed deposition technique. In the same process, other thin film devices, such as prisms, lenses or detectors, can be deposited on the substrate to form the desired utilization circuit 25.

It should be noted that the foregoing embodiments of my invention, as shown in FIGS. 3 and 4, rely upon the special and unique condition: relative propagation constant $\beta_m = \bar{\beta}$ set forth in equation (37) above. More generally, it is also possible to achieve comparable coupling efficiencies with thicknesses of the guides that differ from this unique condition, by tapering the thickness of the guide within the coupling region along the propagation path in accordance with equation (36) above. Such a modified embodiment would be implemented in cases in which it was desired in the first instance, for example, to have a thin-film guide 23 of different thickness than would be provided according to equation (37) above.

As a further extension of my invention, output coupling can also be provided by a doubly-tapered gap region which may be substantially similar to the same coupler as described in the FIGS. 1, 2 for input into the guide. The considerations relating to the thickness profiles, $g_1(x)$, $g_2(x)$, $w_1(x)$, $w_2(x)$ of gap and film at input and output now must be interpreted as those profiles which shape the output beam as closely as possible to the desired shape. The principal difference would lie in how the coupler is used, not in its construction. In other words, my improved coupling arrangement for optical thin-film guides is a reversible arrangement.

In the foregoing specifically described embodiment a fundamental order Gaussian beam profile was assumed which is typical for many lasers. This resulted in an optimum gap width $g_o(x)$ that increases monotonically throughout the coupling region. It should be understood that this is not necessarily so for other profiles of the incident beam. For a Gaussian beam of a higher order mode the optimum gap profile may have, in accordance with equation (35), regions of increasing gap thickness alternating with regions of decreasing gap thickness.

In this connection it should also be pointed out here that equation (35) was derived under the assumption of weak coupling $s(x) << 1$. The approximations permitted by this assumption break down in a short region at the very beginning of the coupling region. There, equation (34) diverges and equation (35) yields negative values for $g_o(x)$. In practice, one would make $g(x) = 0$ there. This causes, as can be shown, a minor reduction of the obtained coupling efficiency. This reduction becomes smaller, however, as the width of the beam, measured in x-direction is increased.

Figure 5:
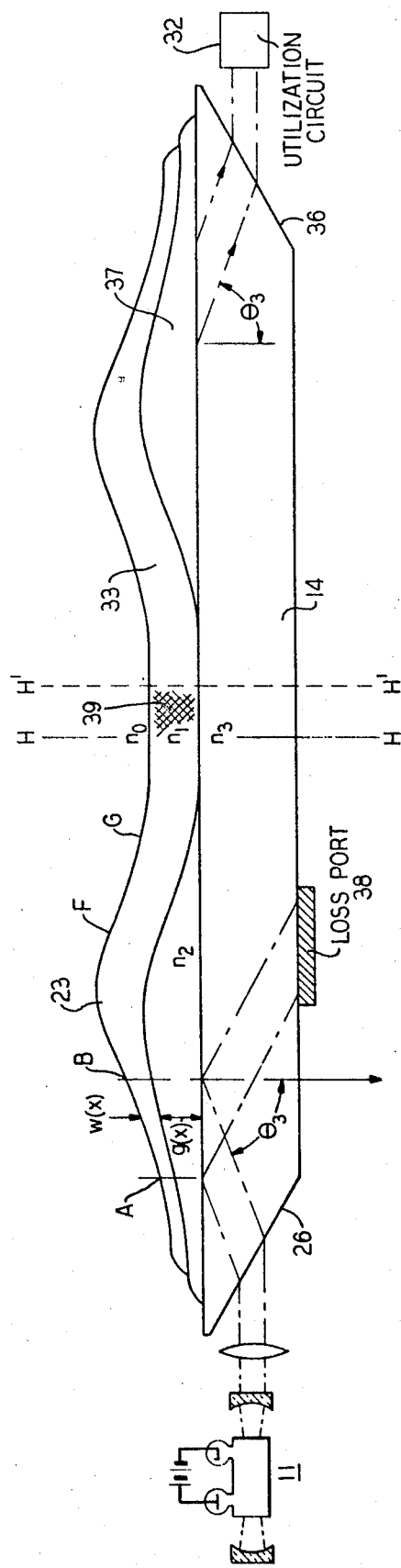
FIG. 5 is a modification of the embodiment of FIG. 4 providing both input and output coupling.

A modified embodiment adapted from that of FIG. 4 to provide output coupling is shown in FIG. 5. The left-hand portion to the left of dashed line HH may be essentially identical to the embodiment of FIG. 4 and is so numbered. The portion of the arrangement to the right of dashed line H'H' is a mirror image of the arrangement to the left of line HH and will provide output coupling from the extension 33 of guide 23 through the doubly-tapered gap region 37 into the substrate 14 in which the light beam will propagate as a free wave at the angle $\theta_3$ with respect to the normal. This output light beam is refracted at the output face 36 of substrate 14 to propagate toward external utilization circuit 32. In the space between the couplers, i.e., between the lines HH and H'H', there could be placed, for example, a light modulating thin-film device 39.

The operation of the output coupling of the coupling arrangement is essentially a controlled leakage out of the guide, as described by equation (38) above.

In FIG. 6, a modified embodiment is shown employing partial output couplers 70 and 71, in which the thickness profiles of the coupling gaps have been designed to couple out only a prescribed fraction of the light propagating in the guide 63. Several such partial couplers 70 and 71 may be connected in series, each one "tapping," or draining off, part of the energy in the guide 63.

As before, the laser light is 632.8 nanometer laser light coupled into guide 63 as described for the preceding embodiments. The guide 63 is typically zinc sulfide having an index of refraction $n_1 = 2.35$, with thickness $w(x)$ varying typically from about a fraction of a wavelength to several wavelengths. The gap material 67 is magnesium fluoride ($MgF_2$) with an index of refraction $n_2 = 1.38$ and thickness $g(x)$ varying repetitively from zero to several wavelengths and back to zero again. The substrate 64 is glass having an index $n_3$ of 1.52. In those regions where $g(x)$ is zero, $w(x)$ is large enough to make the relative propagation constant $\beta$ of guide 63 larger than $n_3$, so that guiding is maintained.

The substrate 64 is notched at appropriate points to form the output coupling prisms 65 and 75 of the partial output couplers 70 and 71.

From point G to point A coupler 70 is shown as a stepped version for the output coupler of FIG. 5 for the purpose of indicating its function simply. From A to G', the coupler 70 is shown as a stepped version of the input coupler of FIG. 6 in order to return the guide 63 to a zero-gap condition ($g(x) = 0$).

The function of the individual steps in this coupler is as follows: In GF, the gap is built up smoothly from zero thickness to a maximum thickness $g_{FC}$. The section FE is a piece of uniform guide, connecting to the region ED. There, the thickness $w(x)$ of the guide is smoothly reduced so that the relative propagation constant $\beta$ decreases from its initial value larger than $n_3$ to a value lower than $n_3$ at point D. Therefore, the uniform guide DC is basically leaky, however, the thickness $g_{FC}$ is chosen sufficiently high to make this leakage negligible for all practical purposes. In section CB of the thickness of the gap is reduced, smoothly, so that a point B the leakage becomes substantial. This is the beginning of the actual output coupling region, BA. In this latter region, the gap width $g(x)$ is designed according to equation (38).

For an exact design of the gap profile $g(x)$, these quantities must be known: The fraction $f$ of the incident power $P_i$ that is to be coupled out so that the outgoing power is $P_3 = fP_i$; and the desired power distribution $Q_3(x)$ of the outgoing beam, measured along the surface of the prism, $$P_3 = \int_B^A Q_3(x) dx \quad (41)$$

From $Q_3(x)$ then first the local power flow $P_1(x)$ in the guide is determined as $$P_1(x) = P_i - \int_B^x Q_3(x) dx \quad (42)$$

With this, and equation (38), the coupling strength $s(x)$ is then found as $$s(x) = [Q_3(x)/(2aP_1(x))]^{1/2} \quad (43)$$

Finally, the required gap profile itself follows from equation (35) with $s(x)$ inserted for $s_o(x)$. Here and in the factor $a$ of equation (43), the value $\beta_c = n_3 \sin \theta_3$ has to be used for $\beta$ where $\theta_3$ is the desired angle at which the output beam should emerge. The required thickness profile $w(x)$ of the guide depends on the value of $\beta_c$, and is found from equation (36) with $\beta_c$ there instead of $\beta_m$. Advantageously, the angle $\theta_3$ is chosen so that $\beta_c = \bar{\beta}$ again, with $\bar{\beta}$ given by equation (37). This choice of $\theta_3$ permits a uniform thickness of the guide in the coupling region between the points B and A of FIG. 6, thus considerably simplifying the fabrication.

Completing the partial output coupler of FIG. 6, in the region AC' the gap thickness is increased again to the value $g_{FC}$ that is sufficient to make leakage negligible. Thus, the fraction $1-f$ of the incident power $P_i$ that is left in the guide at the end point A of the coupling region, is retained in the guide beyond point C'.

The remaining sections C' to G' of FIG. 6 correspond exactly to the sections C to G of FIG. 3: The uniform guide C'D' connects to the section D'E' where the guide thickness increases, in order to bring $\beta$ above $n_3$. Then, the uniform section E′F′ connects to the region F′G′, where the gap thickness is smoothly tapered off. Beyond the point G′ the guide 63 leads to the next partial output coupler 63.

The short connecting sections in this coupler as well as in the couplers of FIG. 3 have been shown only for better clarity. In practice, the thickness steps will be made smoother, without the abrupt changes in the slopes. The connecting sections then automatically become integral parts of the coupler.

It should be understood that, in all the preceding embodiments, ease of handling of the apparatus and optical isolation can be improved by an additional very low-loss, low-index material coated over the top of the guide, so that the guide is not exposed to the atmosphere. This material would fill, partially, the regions characterized by $n_o$ in the FIGS. 2–6. Suitable materials for this purpose are, for example, low-loss glasses which have been substantially freed of iron and other heavy metallic elements. They are not being successfully developed at various research laboratories. Nevertheless, such a protective layer is not a necessary component of my invention.

I claim:

1. A light-wave coupling arrangement of the type in which a prism is disposed in proximity to one of the two major opposite surfaces of a body of optically transparent material to provide coupling of light between the prism and the body by frustrated internal reflection, the separation between said prism and said body being of the order of the wavelength of said light, said body having an index of refraction exceeding the ones of the materials bounding said body on said opposite surfaces and having a thickness between said opposite surfaces comparable to the wavelength of said light, said arrangement being characterized in that the separation $g(x)$ of said body and said prism varies for a first distance along the path of said light to enable phase-matched cumulative coupling of said light into said body, and the thickness of said body between said opposite surfaces varies to proportion the relative propagation constant $\beta$ of said body to provide said phase-matched cumulative coupling throughout said first distance along said path.

2. A light-wave coupling arrangement of the type claimed in claim 1 in which the body of optically transparent material is proportioned to have a constant relative phase constant, $\beta$, throughout the first distance, where $\bar{\beta} = (n_2^2 + n_3^2)^{1/2}$ for TE polarization, and $\bar{\beta} = \left(\dfrac{n_2^4 n_3^2 + n_3^4 n_2^2}{n_2^4 + n_3^4}\right)^{1/2}$ for TM polarization, where $n_2$ is the index of refraction prevailing in the separation between the body and the prism, and $n_3$ is the index of refraction of the prism.

3. A light-wave coupling arrangement of the types claimed in claim 1 in which the prism is disposed in proximity to the one of the two major opposite surfaces of a body of optically transparent guide material and is separated therefrom by a layer of transparent gap material with a thickness of the order of the wavelength of said light to provide coupling of said light from the prism to the body by frustrated internal reflection, said arrangement being characterized in that the thickness of said layer of transparent gap material is increased throughout said distance in the direction of propagation to enable said cumulative coupling.

4. A light-wave coupling arrangement according to claim 3 in which the thickness, $g_o(x)$, of the gap material adjacent the region of frustrated internal reflection is increased according to the relationship $g_0(x) = (\lambda/4\pi)(\beta_m^2 - n_2^2)^{-1/2} \ln\left[2a \int_{-\infty}^{x} |V_3(\zeta)/V_3(x)|^2 d\zeta\right]$ or to an approximation thereof, where $\lambda$ is the light wavelength, $\beta_m$ is the relative propagation constant of the light in the $m$th mode of propagation in the adjacent body, $n_2$ is the index of refraction of the transparent gap material, $a$ is $a = \dfrac{4\pi}{\lambda} \sin 2\phi_{32} \sin 2\phi_{12}$ $\times \left[\dfrac{\partial}{\partial \beta_m}\left(\dfrac{4\pi}{\lambda} w(x)(n_1^2 - \beta_m^2)^{1/2} - 2\phi_{10}(\beta_m) - 2\phi_{12}(\beta_m)\right)\right]^{-1}$ where $n_1$ is the refractive index of the body, $n_3$ the refractive index of the coupling prism material, and $n_o$ the refractive index of the material bounding said body on the major surface opposite to the major surface bounded by the gap, $V_3(x)$ is the local peak amplitude of the incident light field inside the coupling prism, and $x$ is the distance measured along the path of the light in the body, and $\Phi_{12}$ and $\Phi_{10}$ are the reflection phases at the major surfaces of the body, and $\Phi_{32}$ is the reflection phase of the interface of prism and gap, these phases depending on polarization, for TE polarization:

$\phi_{12} = a \tan\left(\dfrac{\beta_m^2 - n_2^2}{n_1^2 - \beta_m^2}\right)^{1/2}$ $\phi_{10} = a \tan\left(\dfrac{\beta_m^2 - n_0^2}{n_1^2 - \beta_m^2}\right)^{1/2}$ $\phi_{32} = a \tan\left(\dfrac{\beta_m^2 - n_2^2}{n_3^2 - \beta_m^2}\right)^{1/2}$ for TM polarization:

$\phi_{12} = a \tan\left[\dfrac{n_1^2}{n_2^2}\left(\dfrac{\beta_m^2 - n_2^2}{n_1^2 - \beta_m^2}\right)^{1/2}\right]$ $\phi_{10} = a \tan\left[\dfrac{n_1^2}{n_0^2}\left(\dfrac{\beta_m^2 - n_0^2}{n_1^2 - \beta_m^2}\right)^{1/2}\right]$ $\phi_{32} = a \tan\left[\dfrac{n_3^2}{n_2^2}\left(\dfrac{\beta_m^2 - n_2^2}{n_3^2 - \beta_m^2}\right)^{1/2}\right]$ 5. A light-wave coupling arrangement according to claim 4 in which $g(x)$ is smoothly decreased with increasing $x$ past the region of frustrated internal reflection while the relative phase constant $\beta$ of the light in the body is smoothly increased for values of increasing $x$ past said region until reaching a value sufficient to prevent substantial reverse coupling, $g(x)$ going eventually and smoothly to zero.

6. A light-wave coupling arrangement according to claim 5 including an output coupling portion which is a mirror image of the aforesaid portion of the arrangement about an intermediate value of $x$.

7. A light-wave coupling arrangement according to claim 5 including a plurality of output coupling portions, at least one of which includes a portion of the gap material and a portion of the guide material having contours which are approximately mirror images of the contours of the aforesaid input coupling portion of the arrangement about an intermediate value of $x$ for each of said input coupling portion and said one output coupling portion, said output coupling portion having lengths and thicknesses of said gap material and said guide material effective to couple out less than all of the energy propagating in said guide in the vicinity of said output coupling portion.

8. A light-wave coupling arrangement according to claim 7 in which a second output coupling portion is substantially similar to said first output coupling portion.

9. A light-wave coupling arrangement of the type claimed in claim 1 adapted to provide output coupling from the body to the prism in that the separation $g(x)$ and the thickness $w(x)$ of the body are varied to provide a desired radiation pattern from said body.

10. A light-wave coupling arrangement of the type claimed in claim 9 in which the separation $g(x)$ varies to yield a net decrease from start to end of the first distance in the direction of propagation.

11. A light-wave coupling arrangement of the type claimed in claim 10 in which the body of optically transparent material is proportioned to have a constant relative phase constant, $\bar{\beta}$, throughout the first distance, where $\bar{\beta} = (n_2^2 + n_3^2)^{1/2}$, for TE polarization, and $$\bar{\beta} = \left(\frac{n_2^4 n_3^2 + n_3^4 n_2^2}{n_2^4 + n_3^4}\right)^{1/2}$$

for TM polarization, where $n_2$ is the index of refraction prevailing in the separation between the body and the prism, and $n_3$ is the index of refraction of the prism.

12. A light-wave coupling arrangement of the type claimed in claim 1 adapted to provide output coupling from the body to the prism in that the thickness $w(x)$ of the body is decreased from a first value preventing said coupling during a second distance along the path preceding the first distance in the direction of propagation, and the separation $g(x)$ is first increased for said second distance preceding said first distance to inhibit said coupling and is thereafter decreased during said first distance to enable said coupling.

13. A light-wave coupling arrangement of the type in which a coupling means is disposed in proximity to one of the two major opposite surfaces of a body of optically transparent material to provide coupling of light between the coupling means and the body by the evanescent field of said light, the separation between said coupling means and said body being of the order of the wavelength of said light, said body having an index of refraction exceeding the ones of the materials bounding said body on said opposite surfaces and having a thickness between said opposite surfaces comparable to the wavelength of said light, said arrangement being characterized in that the separation $g(x)$ of said body and said coupling means varies for a first distance along the path of said light to enable phase-matched cumulative coupling of said light into said body, and the thickness of said body between said opposite surfaces varies to proportion the relative propagation constant $\beta$ of said body to provide said phase-matched cumulative coupling throughout said first distance along said path.